United States Patent
Chen

(10) Patent No.: US 6,970,955 B2
(45) Date of Patent: Nov. 29, 2005

(54) POWER OFF METHOD FOR WIRELESS PERIPHERAL DEVICE

(76) Inventor: Cliff Chen, 4F, No. 22, Sec. 6, Hsin I Rd., Taipei (TW)

( * ) Notice: Subject to any disclaimer, the term of this patent is extended or adjusted under 35 U.S.C. 154(b) by 187 days.

(21) Appl. No.: 10/614,163

(22) Filed: Jul. 8, 2003

(65) Prior Publication Data
US 2005/0009496 A1    Jan. 13, 2005

(30) Foreign Application Priority Data
Mar. 18, 2003 (TW) ............................. 92105967 A

(51) Int. Cl.$^7$ ............................................. G06F 3/00
(52) U.S. Cl. ........................... 710/18; 710/14; 710/17; 710/19; 710/74
(58) Field of Search ..................... 710/16, 17, 18, 710/19, 14, 67

(56) References Cited

U.S. PATENT DOCUMENTS

| | | | |
|---|---|---|---|
| 5,861,822 A | * | 1/1999 | Park et al. ................. 341/22 |
| 6,098,174 A | * | 8/2000 | Baron et al. .............. 713/300 |
| 6,121,881 A | * | 9/2000 | Bieback et al. .......... 340/573.1 |
| 6,587,951 B1 | * | 7/2003 | Flanigan .................. 713/310 |
| 6,766,392 B2 | * | 7/2004 | Furukawa et al. .......... 710/67 |
| 6,781,570 B1 | * | 8/2004 | Arrigo et al. ............. 345/158 |
| 6,801,967 B2 | * | 10/2004 | Nakamura et al. .......... 710/62 |
| 2003/0073434 A1 | * | 4/2003 | Shostak .................. 455/426 |
| 2003/0085621 A1 | * | 5/2003 | Potega .................... 307/18 |

* cited by examiner

Primary Examiner—Kim Huynh
Assistant Examiner—Alan S. Chen
(74) Attorney, Agent, or Firm—Rosenberg, Klein & Lee

(57) ABSTRACT

A power off method for a wireless device is proposed. A battery is installed in the wireless device as the power supply. When the power source is connected to the wireless device, an identification process is conducted between the wireless device and the wireless receiver connected to a computer. After the completion of successful identification process, the control chip within the wireless device stores a set of ID code that can be identified by the wireless receiver. In order to prevent wireless devices from being inadvertently reactivated, these devices are usually turned off during traveling. The present invention provides a power off method that terminates power to all parts of the wireless device except the control chip by a certain operation on the connect button. Therefore, an individual power switch is not required while the device can be turned off, and resume the normal operation on the next power on.

18 Claims, 3 Drawing Sheets

POWER OFF METHOD FOR WIRELESS PERIPHERAL DEVICE

BACKGROUND OF THE INVENTION

1. Field of the Invention

The present invention relates to a power off method for a wireless device and, more particularly, to a power off method for a wireless device, whereby signals emitted from a wireless device can be successfully received by a wireless receiver after completing the identification process between the wireless device and the wireless receiver.

2. Description of the Related Art

Because of rapid advancement in the field of wireless transmission technology, the immunity to external interference has greatly enhanced and the transmissible distance has also significantly extended. Base on these advantages, the wireless transmission technology has been applied and integrated to computer peripherals, such as wireless mice and wireless keyboards in computer systems.

A wireless mouse is presented here as an example to illustrate the proper operation between computer and a wireless computer peripheral device. The wireless mouse generally requires an independent power source such as a standard alkaline battery or a rechargeable battery to drive all the necessary function. The wireless mouse can be automatically turned on when battery is loaded. Alternatively, the wireless mouse can also be manually turned on/off by operating an additional power switch.

Refer to FIG. 1; in order for computer 63 to be able to receive the signals emitted from the wireless mouse 61, a wireless receiver 62 is employed and connected to the computer 62. The wireless mouse 61 stores an ID code to facilitate the identification by the wireless receiver 62. The wireless receiver 62 can hence properly identify the signals emitted from wireless mouse 61. In order to shield the wireless mouse 61 from the external interference caused by other wireless devices (e.g., other wireless mouse or wireless keyboard) in the vicinity, the wireless mouse 61 generally stores several sets of ID codes. The internal code returns to its default value every time the wireless mouse 61 incurs a power reset. Therefore, it is necessary to first execute an ID code synchronization process with the accompanied wireless receiver 62 by pressing a connect button (not shown). Subsequently, various operations of the wireless mouse 61 are accurately accepted by the wireless receiver 62 and then sent to the computer 63.

However, after the wireless mouse 61 has idled for a certain period of time, in order to save the battery power, the wireless mouse 61 enters a power-saving mode (sleep mode). Even the wireless mouse 61 has entered into sleep mode to save power, it is still likely to be inadvertently waked up by a heavy shake, or a touch on the mouse button happens to be made by the vicinal objects during travel.

Hence, the internal battery of the wireless mouse 61 is either removed or disconnected for traveling purpose. The internal ID code of the wireless mouse will go back to the reset value at the time the power source of the wireless mouse is re-connected. And a process of ID code synchronization between the mouse and the receiver has to be conducted again. It is really an undesirable waste of time for repeatedly doing the synchronization process every time the power source is reconnected.

In order to solve the problem of returning ID code to reset value due to the power interruption, a nonvolatile memory is employed by some wireless products to perpetually keep the ID code. Although this is a feasible solution to the above-mentioned dilemma, the I/O pin count of the mouse controller has to be increased for connecting to the nonvolatile memory. The increasing in I/O pin count also increases chip size and cost.

Accordingly, the present invention aims to propose a power off method for a wireless peripheral device to solve the problems experienced in the prior art.

SUMMARY OF THE INVENTION

The primary object of the present invention is to provide a power off method for a wireless device without having to add an individual power switch. The mechanism to approach the goal is to share an existing button, such as the connect button, but apply different operation on the button. Although a wireless device, being powered off by the proposed method, still has power connected to the controller (all relevant information thus preserved), the power consumption is insignificant because of the halt mode of the controller. When the device resumes from power off mode, the connection with the receiver is immediately recovered and ready to operate. There is no need to add a nonvolatile memory.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE EMBODIMENTS

Figure 1:
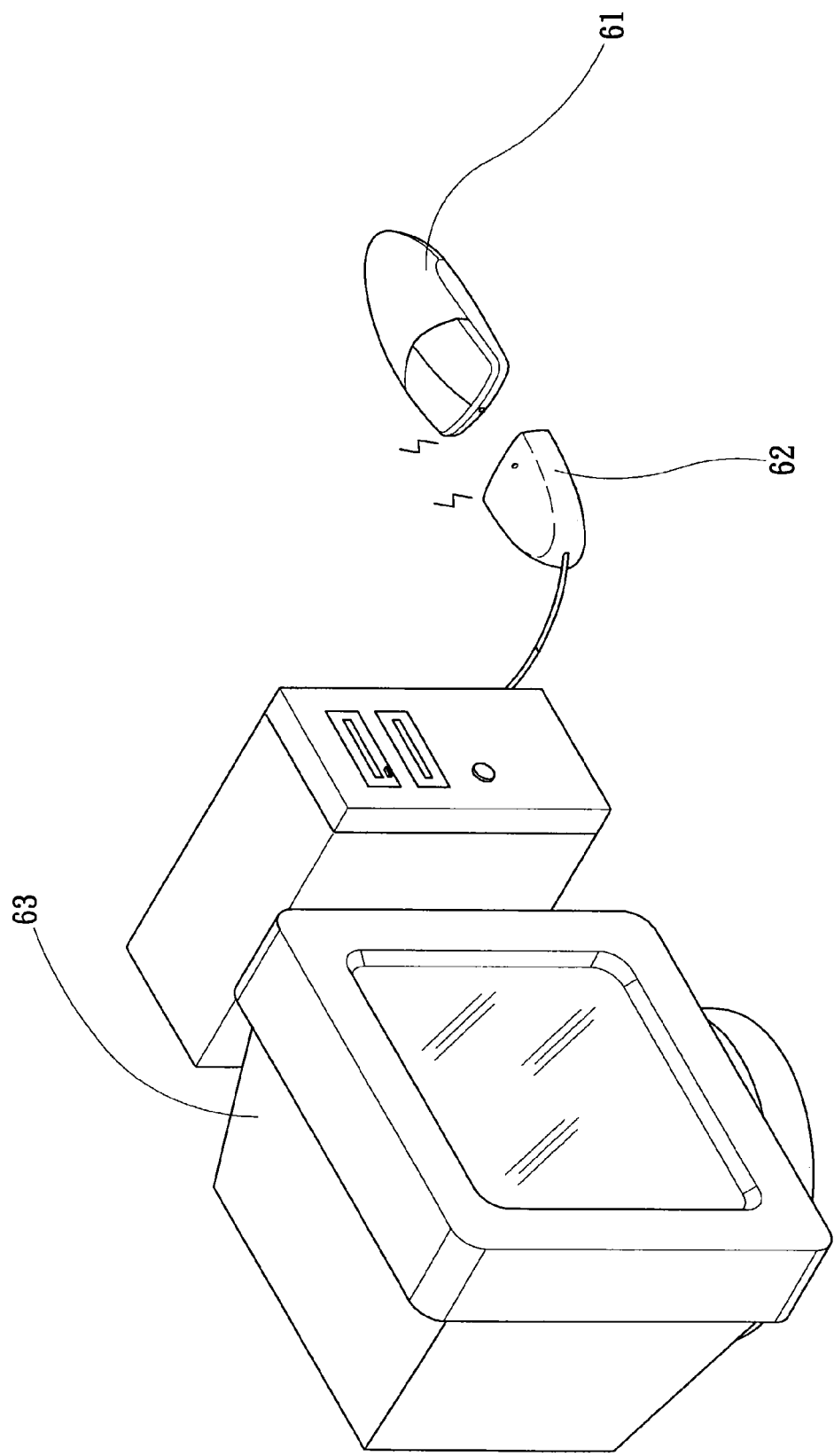
FIG. 1 is an illustration of the transmission manner between a wireless mouse and a computer.
Figure 2:
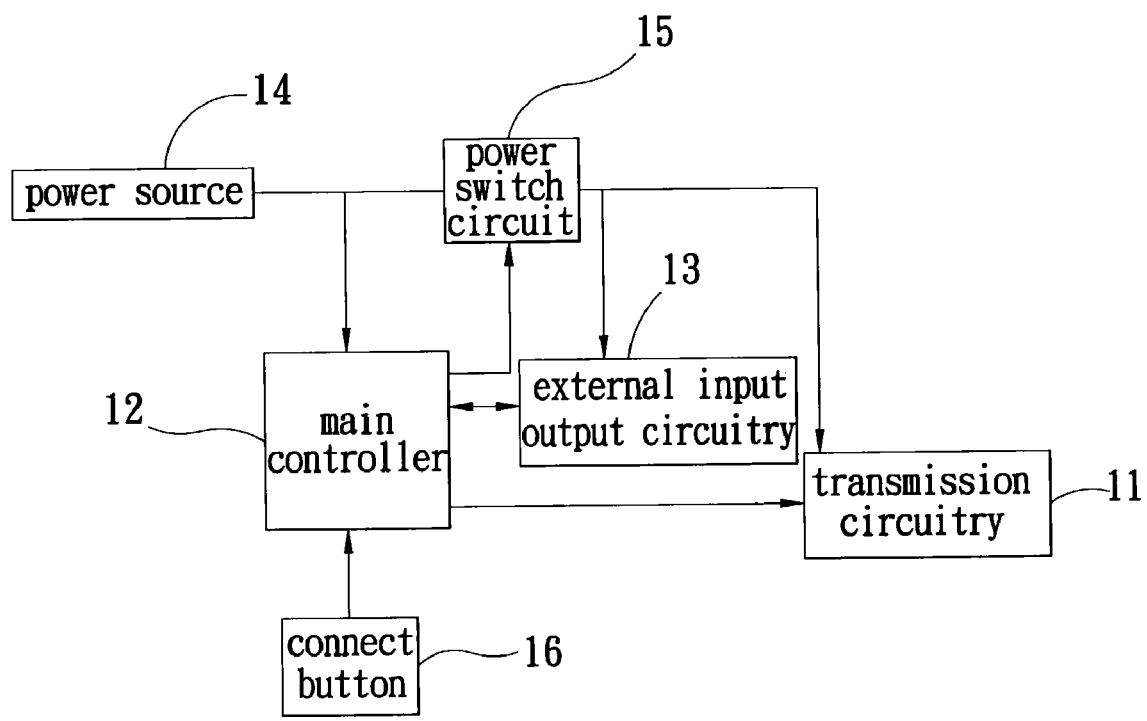
FIG. 2 is a block diagram of a wireless device.

As shown in FIG. 2, a wireless peripheral device consists of a transmission circuitry 11, a main controller 12, a peripheral circuitry 13, a power source 14, a power switch circuit 15, and a connect button 16. The transmission: circuitry 11 is used to send a wireless signal to a wireless receiver of a computer. The main controller 12 handles the entire operation of the wireless device and also keeps a set of ID code that is to be identified by the wireless receiver 62. The peripheral circuitry 13 is used to carry out various operations of the wireless peripheral device (e.g., cursor movement, key activation, and scrolling wheel manipulation in a wireless mouse.) The power source 14 provides a steady DC voltage to the wireless device. The power switch circuit 15 is used to connect or disconnect the power to the transmission circuitry 11 and the peripheral circuitry 13. In addition to activating a synchronization process with the wireless receiver of the computer, the connect button 16 is also used to turn the power on and off in the present invention.

After the synchronization process between the wireless device and the wireless receiver is successfully completed, a specific identifiable ID code for the wireless receiver is stored in the main controller 12 in the wireless device. Subsequently, the signals emitted by the wireless peripheral device can be received by the wireless receiver and then sent to the computer.

When the wireless device is in the power-on state, the control chip 12, which stores the ID codes, actually consumes a marginal amount of power in comparison to other parts in the wireless peripheral device. Therefore, in the wireless peripheral device according to the present invention, electrical power from battery is always supplied to the control chip 12 even the wireless peripheral device is powered off. The method saves power and cost, yet keeps the ID code perpetually. Thereby, it successfully avoids the trouble for the wireless device to undergo the synchronization process with the wireless receiver each time the power source is reconnected.

The method of the present invention is illustrated below. After the connect button 16 is depressed for a period of time T, the main controller 12 disconnects the power supplied to all other parts for setting the wireless peripheral device into a sleep (or halt) mode. The ID code information is preserved in the main controller. To awake the wireless peripheral device, simply press the connect button in a single click manner. Since the ID code information is preserved, the wireless peripheral device is ready to operate.

Figure 3:
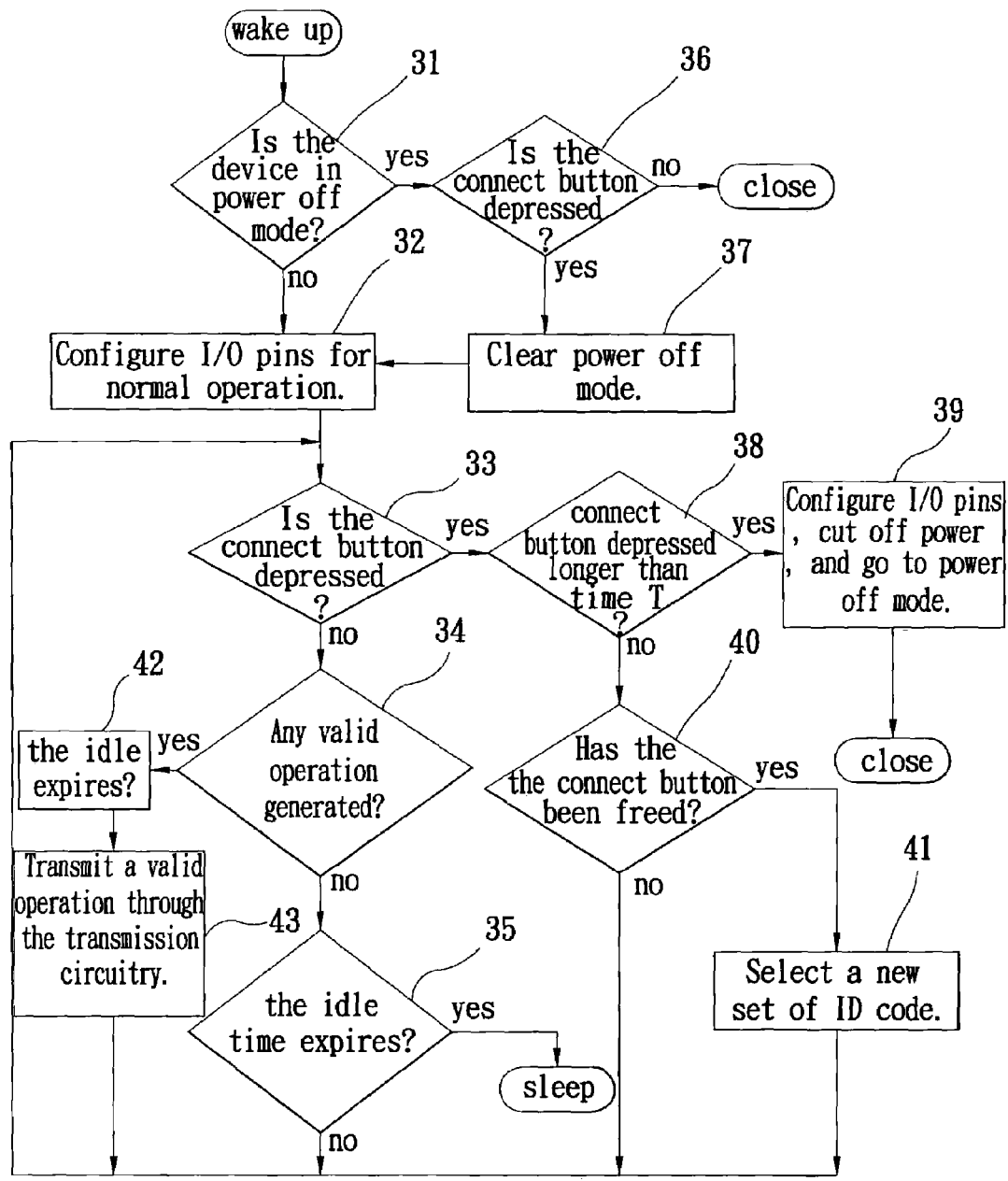
FIG. 3 is a control flowchart to reveal the present invention.

FIG. 3 is the control flowchart of the present invention, in which the process of synchronizing the wireless device to the receiver is not shown. It is assumed the process has already been done, so the main controller keeps a validated ID code. The method of the present invention comprises the following steps:

Step 31: When the wireless device is waked up, determine whether it is in power off mode or not. A flag is used to record the state of power on or off. If it is in power off mode, proceed to Step 36; otherwise, to Step 32;

Step 32: Configure the I/O pins for normal operation;

Step 33: Determine whether the connect button is depressed or not. If it is, proceed to Step 38; otherwise to Step 34;

Step 34: Check if any valid operation of the peripheral circuit has occurred. If it has, proceed to Step 42; otherwise to Step 35;

Step 35: Check if the idle time counted by the timer has reached a preset value. If it has, the wireless device enters the sleep mode without setting the power off flag; otherwise, go back to Step 33;

Step 36: Determine whether, the connect button is depressed or not. If it is, proceed to Step 37; otherwise, the wireless device remains in; the power off mode;

Step 37: Clear the power off flag, then proceed to Step 32;

Step 38: Determine whether the connect button is kept holding for time duration exceeding a period of time T. If it has, proceed to Step 39; otherwise, to Step 40;

Step 39: Configure the I/O pins to minimize power consumption, and to cut off the power supplied to all circuitry except the main controller itself, then go to sleep mode with the power off flag set; to awake the wireless peripheral device, the connect button should be pressed and the step 36 is executed;

Step 40: Check if the connect button has been released. If it has proceed to Step 41; otherwise, to Step 33;

Step 41: Randomly select a new set of ID code and transmit the new ID through the transmission circuitry, then proceed to Step 33;

Step 42: Refresh the timer; and

Step 43: Transmit a valid operation through the transmission circuitry.

Upon wakeup, if the wireless device is not in the power off mode (i.e., the answer to Step 31 is no,) the device goes to normal operation after properly setting the I/O configuration. If the wireless device is to be turned off, it is necessary to press and hold the connect button for a period longer than time T (i.e., the answer to Step 38 is yes.) In Step 39, the power source is disconnected to all other parts. Only the main controller consumes a very little power to preserve all relevant information for quick recovery on the next time power on. The power off flag is set to indicate the wireless device is in power off mode.

When the wireless device is in the power off mode, only by pressing the connect button (i.e., the answer to Step 36 is yes) can bring the wireless device back to normal operation.

To sum up, the power off method of the present invention therefore has the following characteristics:

(1) When the wireless device is resumed from power off mode, the original synchronization information for the wireless receiver is recovered again, and the device is ready to operate.

(2) The wireless device can be turned off by pressing a connect button instead of removing the battery.

(3) Since powering on and off are done by pressing the connect button, an additional power switch is eliminated and the circuit board size therefore can be minimized. Hence, a wireless mouse according to the present invention, can be further miniaturized to accompany a notebook computer for the purpose of mobility.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intending to be embraced within the scope of the invention as defined in the appended claims.

I claim:

1. A power off method for a wireless device, the wireless device comprising at least one peripheral circuit, a control chip and a power source providing power to the control chip and the peripheral circuit, the method comprising the steps of:

pressing a button of said wireless device;

terminating the power to said at least one peripheral circuit of said wireless device and maintaining the power to said control chip responsive to said button being pressed, hence bringing said wireless device into a power off mode; and said control chip maintaining an active ID code during the power off mode for use at a next turn on mode for saving connection time of said wireless device.

2. The power off method for a wireless device as claimed in claim 1, further comprising a step to determine whether said button has been pressed longer than a preset period of time T or not.

3. The power off method for a wireless device as claimed in claim 2, wherein a power off function is enabled if said button is depressed for a period exceeding said time T.

4. The power off method for a wireless device as claimed in claim 2, wherein a function of changing a new ID code is enabled if said button is pressed for a period shorter than the preset time T.

5. The power off method for a wireless device as claimed in claim 1, further comprising a step of setting proper I/O configurations before entering into power off mode so as to reduce power consumption.

6. The power off method for a wireless peripheral device as claimed in claim 1, wherein the said wireless device has to be resumed by pressing said button again, if said wireless device has been put in the power off mode through said method.

7. A power off method for a wireless peripheral device, comprising the steps of:
- initiating a synchronization process to uniquely identify said wireless peripheral by selecting one of a plurality of ID codes by a control chip for use in communications with a computer;
- pressing a key of said wireless peripheral;
- terminating power supplied to all other parts of said wireless peripheral except said control chip responsive to said key being pressed to define a power off mode, said control chip maintaining said selected ID code during said power off mode for subsequent communications with the computer;
- pressing said key of said wireless peripheral while in said power off mode; and
- reinitiating supplying power to said other parts of said wireless peripheral responsive to said step of pressing said key of said wireless peripheral while in said power off mode, said control chip continuing to use said selected ID code without repeating said synchronization process.

8. The power off method for a wireless peripheral device as claimed in claim 7, further comprising a step to determine whether said key has been pressed over a preset period of time T or not.

9. The power off method for a wireless peripheral device as claimed in claim 8, wherein said step of terminating power is initiated responsive to said key being pressed for a period of time exceeding said time T.

10. The power off method for a wireless peripheral device as claimed in claim 8, wherein said synchronization process is initiated responsive to said key being pressed for a period of time not exceeding said time T.

11. The power off method for a wireless peripheral device as claimed in claim 7, wherein the step of terminating power further includes the step of configuring I/O pins to minimize power consumption.

12. A power off method for a wireless peripheral device, wherein said wireless peripheral device emits wireless signals to a wireless receiver which is connected to a computer, a control chip of said wireless peripheral device storing a selected one of a plurality of ID codes after the completion of an identification process between said wireless peripheral device and said wireless receiver, wherein the signal emitted from said wireless peripheral device is received by said wireless receiver and said power off method comprises the following steps:
- pressing a key of said wireless peripheral device; and
- maintaining power supplied to said control chip and terminating power supplied to all other parts of said wireless device, said control chip maintaining said selected ID code during said power off mode for during a subsequent turn on mode to save connection time between said wireless peripheral device and said wireless receiver.

13. The power off method for a wireless peripheral device as claimed in claim 12, further comprising a step of determining whether said key has been pressed for a time that exceeds a preset time T.

14. The power off method for a wireless peripheral device as claimed in claim 13 wherein said step of maintaining power supplied to said control chip and terminating power supplied to all other parts of said wireless device is initiated responsive to said key being pressed for a period of time exceeding said preset time T.

15. The power off method for a wireless peripheral device as claimed in claim 13, wherein the identification process is initiated responsive to said key being pressed for a period of time shorter than preset time T.

16. The power off method for a wireless peripheral device as claimed in claim 12, wherein said step of maintaining power supplied to said control chip and terminating power supplied to all other parts of said wireless device includes the step of configuring I/O pins to minimize power consumption.

17. The power off method for a wireless peripheral device as claimed in claim 12, further comprising the step of pressing said key a subsequent time in order to restore power supplies to said all other parts of said wireless peripheral device.

18. The power off method for a wireless peripheral device as claimed in claim 12, wherein said wireless peripheral device is a wireless mouse or a wireless keyboard.

* * * * *